United States Patent [19]

Suckow

[11] Patent Number: 4,879,912
[45] Date of Patent: Nov. 14, 1989

[54] UNITIZED INSTRUMENT MANIFOLD
[75] Inventor: William H. Suckow, Amarillo, Tex.
[73] Assignee: J. M. Huber Corporation, Rumson, N.J.
[21] Appl. No.: 165,662
[22] Filed: Mar. 8, 1988
[51] Int. Cl.⁴ .................. G01F 1/425; G01L 13/02
[52] U.S. Cl. ............................ 73/861.61; 73/756; 137/597; 137/886
[58] Field of Search .............. 73/756, 861.42, 861.52, 73/861.61, 716; 137/597, 886

[56] References Cited
U.S. PATENT DOCUMENTS 4,319,492  3/1982  Hewson et al. ................. 73/756
4,453,417  6/1984  Moyers ....................... 73/861.42
4,711,268 12/1987  Coleman ........................ 73/756

Primary Examiner—Donald O. Woodiel
Attorney, Agent, or Firm—Alec H. Horn; Harold H. Flanders; Robert L. Price

[57] ABSTRACT

There is disclosed a unitized instrument manifold which creates a double block and bleed valving arrangement for use with a flow recording or measuring device. The bleed valve assembly permits venting of a first channel to the outside while in the open position yet does not interfere with the flow of fluid through the length of the first channel while the bleed valve assembly is in the closed position. The unitized manifold, including block and bleed valve chambers, may be cleaned by passing a narrow rigid rod through the channels of the manifold.

17 Claims, 2 Drawing Sheets ent manifold.

UNITIZED INSTRUMENT MANIFOLD

FIELD OF THE INVENTION

This invention relates to a unitized valve manifold, and more particularly to a unitized double block and bleed instrument manifold for interposing between a flow measuring means and a flowing pipeline containing an orifice plate.

BACKGROUND OF THE INVENTION

In a pipeline flowing a product, such as steam or natural gas, it often becomes necessary to measure the flow of the product through the pipeline. One widely employed technique for measuring the flow through the pipeline involves the use of an orifice plate or restriction in the pipeline to create a pressure drop. The upstream or downstream pressure is sensed to provide a reference signal, called the static pressure signal, to the flow monitoring instrument. The pressure differential across the orifice is measured and compared to the reference signal to calculate the volume flowing through the pipeline.

It is well known that a unitized manifold body which incorporates a plurality of valve assemblies between a network of internal flow passages is desirable to minimize leak points and simplify installation. A typical double block instrument manifold is described in U.S. Pat. No. 4,453,417 to Moyers et al.

Depending upon the fluid being measured, accumulations of paraffin, sand or scale may accumulate in the flow passages of the manifold body, thereby forming restrictions or blockages. Any interference in the flow passages adversely affects the accuracy of the pressure measuring instruments. Accordingly, it is a practice in the industry to remove accumulated scale by "rodding" the passageways in the manifold. Rodding refers to the procedure in which a long, thin metal rod is forced through the manifold flow passages to break free any accumulated solids, which are then flushed from the system.

As instrument manifolds have become more widely accepted, it has been suggested to incorporate two "block" valve assemblies and a "bleed" valve assembly into a single body to further reduce manufacturing and installation costs, and to eliminate possible leak points. The incorporation of a bleed valve assembly into the unitized body need not increase the bulk or weight of the manifold body, and creates an instrument manifold commonly referred to as a "double block and bleed" manifold. More particularly, it is conventional to install a small, hard seat "mini-valve" in the body above the main channel of the manifold body to provide a convenient method of venting the main channel to the atmosphere. A significant disadvantage of prior instrument manifolds having a unitized bleed valve assembly is that when some flow passages are rodded, the rodding process often drives and compresses small amounts of solids into other inaccessible flow passages of the manifold, resulting in disposal or disassembly of the manifold.

It is a further disadvantage of prior unitized manifolds that a "soft seat" valve assembly has typically been placed in a flow passage if that passage is to permit rodding. A soft seat valve assembly has a metallic conical plug which presses against the inside of an elastomeric seat fixed inside the valve chamber to effectively block the flow passages and seal against the passage of fluid through the valve. Although a soft seated valve assembly provides a good gas tight seal, it is severely limited by the pressure and temperature which the seat may tolerate. Typically, a soft seat valve may tolerate a maximum temperature of 200° F. For some applications, a high temperature resin may be used to extend the temperature range to approximately 400° F.; however, these higher temperature resins have inferior sealing capability. In some environments, such as steam measurement, the temperature and pressure in the manifold exceeds the tolerances of the elastomeric soft seat and the system fails.

Many instrument manifolds utilize a valve assembly with a conical plug, sometimes having a ceramic ball tip, placed over a higher pressure vertical chamber in the manifold body to form a metal-to-metal seal. This metal-to-metal seal assembly, called a "hard seat" valve assembly, may tolerate working temperatures up to 1500° F. A disadvantage of the conventional hard seat metal-to-metal valve assembly typically used in instrument manifolds is that it is not roddable. This type of manifold is not preferred by many operators because it permits the accumulation of solid material in the high pressure chamber of the valve assembly which is not accessible by a rod.

SUMMARY OF THE INVENTION

The present invention is directed to a unitized instrument manifold which establishes a double block and bleed valving arrangement for use with a flow measuring device. The body of the present unitized manifold has a plurality of straight cylindrical flow passages or channels with a diameter about 3/16–5/16 inches passing therethrough. A first channel passes through the length of the body and terminates to the outside at the distal ends of the body. Axially disposed along the first channel are three valves which function as a double block and bleed valving arrangement. Two of the three valves each serve to block, or isolate, a high pressure line from a low pressure line and a third valve, located between the block valves, serves to bleed or vent any pressure which might otherwise accumulate between the block valves. All valve assemblies have their respective plugs positioned within the first channel when in their fully closed position. All valve assemblies, including the bleed valve, have their respective plugs positionable exterior of the nominal diameter of the first channel when in their fully open position, so a narrow metal cleaning rod may be passed through the first channel to remove any accumulations of solid material.

A second channel is formed in the body to connect the bleed valve chamber, and therefore the first channel, to the outside of the manifold. Accordingly, when the bleed valve is open, a narrow metal rod may be passed through this second channel to the bleed valve chamber to remove any solid material. Because the valve chamber is sufficiently larger than the bleed valve plug, a flow pathway is formed between the plug and the wall of the valve chamber. For this reason, when the bleed valve is closed and the second channel isolated from the first channel, flow throughout the length of the first channel is unimpeded and a roddable hard seat valve assembly is formed.

The block valve assemblies along the first channel may be oriented at an angle relative to the bleed valve assembly for ease of manual manipulation. The flow passages or channels that complete the manifold for appropriate connections to both the pipeline and the instrument may be oriented as desired to minimize the size and weight of the body without departing from the roddable feature.

In one preferred embodiment of the present invention, the seating surfaces of all valve assemblies are metallic and the body of the manifold contains no plastic parts. Accordingly, the manifold may tolerate elevated temperatures and pressures. In an alternative embodiment of the present invention, the block valve assemblies contain an elastomeric seat and the bleed valve assembly is a roddable hard seat valve.

It is a feature of the present invention to provide a unitized instrument manifold for use with a flow recorder in which all valve chambers and flow passageways in the body may be rodded.

It is another feature of the present invention to provide a unitized instrument manifold capable of sufficient fluid passage while simultaneously minimizing the size and weight of the manifold body.

It is another feature of the present invention to provide a double block and bleed instrument manifold in which the bleed valve may be incorporated into the manifold body without significantly increasing the size and weight of the body.

It is yet another feature of the present invention to provide a unitized instrument manifold wherein the valve assemblies of the manifold may be easily manipulated by hand.

These and other features and objects of the present invention will become apparent from the following detailed description wherein reference is made to the figures in the accompanying drawings.

DESCRIPTION OF PREFERRED EMBODIMENTS

Figure 1:
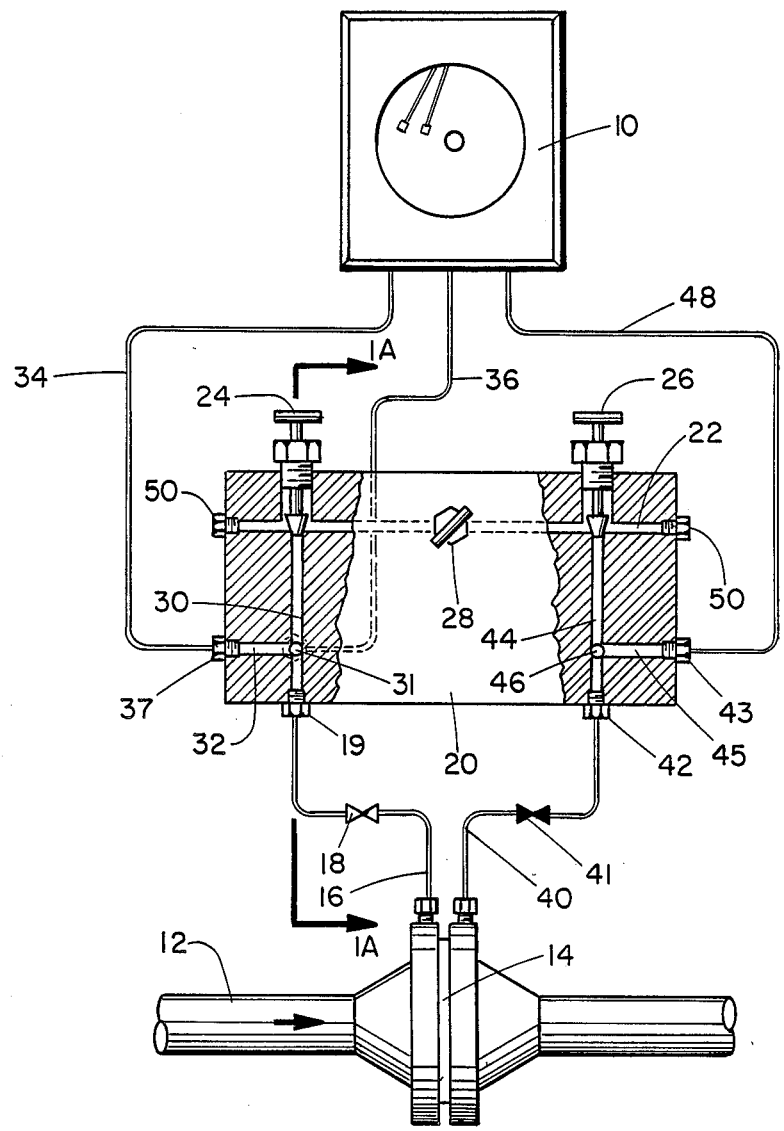
FIG. 1 is a frontal view in partial cross section of a manifold ,of the present invention connected between an orifice plate in a flow line and a flow recording instrument.

Referring now to the drawings, FIG. 1 shows a frontal view of a manifold of the present invention as it would appear in operation connected to a flow recording or transmitting instrument. A gas pipeline 12 has disposed therein an orifice plate 14 which creates a pressure drop to establish a high pressure and a low pressure side in the pipeline. An input line 16 is connected between the high pressure side of the orifice plate and the body of the manifold 20 by connector 19 with a valve 18 between. On the low pressure side of orifice plate 14, an input line 40 is connected to the body of the manifold by connector 42, with valve 41 between.

In order to compute the flow passing through pipeline 12, the flow recording means 10 requires two signals. The first is a static or reference signal which the flow recording means uses as a first value. A high pressure and low pressure line are connected to opposite sides of a differential pressure cell and the pressure differential is detected to produce a second signal. The flow recording means may then calculate the flow based upon the first signal and the second signal.

The body of the manifold contains a plurality of channels or flow pathways for the distribution of fluid therethrough. A first channel 22 passes through the length of the body of the manifold and terminates at each distal end. Disposed within channel 22 is a block valve 24, a block valve 26, and a bleed valve 28. Below and on the high pressure side of block valve 24 is an input channel 30 which is in fluid communication with channels 30 and 32. Below and on the low pressure side of block valve 26 is an input channel 44 in fluid communication with channels 46 and 45. Each of channels 31,32 has an axis approximately at right angles to channel 30 and to each other so as to terminate on a different face of body 20. Each channel 45,46 is similarly positioned with respect to channel 44. A static pressure signal line 34 is connected between flow recording means 10 and channel 32 by a connector 37. A high pressure signal line 36 is connected between flow recording means 10 and channel 31 by a connector 38. A low pressure signal line 48 is connected between flow recording means 10 and channel 45 by connector 43.

It may now be seen that with block valves 24 and 26 in the closed position and valve 18 in the open position, the high pressure side of the orifice plate 14 is in fluid communication with channels 30, 31 and 32 by means of line 16 and the pressure in all of these flow pathways would be identical. Similarly, the low pressure side of the orifice plate 14 is in fluid communication with channels 44, 45 and 46, and the pressure in these flow pathways would be identical. When block valve 26 is in the closed position, and valve 41 is in the open position, a pressure signal is sent to the recorder which is responsive to the pressure on the low pressure side of orifice plate 14. In this way, flow recorder 10 will have the required three pressure signals. If a particular channel is not necessary for the hookup arrangement desired, it may be sealed to the outside by a plug 50.

Because of the great pressure differential between the high pressure side and the low pressure side of the orifice plate, there is a possibility of fluid leaking across block valve 24 into channel 22 and then through block valve 26 into channel 44. If this were to occur during operation this pressure "short circuit" could introduce error in the pressure signals from lines 36 and 48, rendering the reading from flow recording means 10 inaccurate.

In order to obviate this possibility, a bleed valve 28 is placed within first channel 22 such that any gas which leaks across closed block valve 24 would vent to the outside by means of vent channel 52 rather than across block valve 26 and into channel 44. To maximize the space for hand operation of the manifold of the present invention, it has been found convenient to orient bleed valve 28 at a right angle to block valves 24 and 26. During operation of flow recording means 10, block valves 24 and 26 are closed, and valves 28, 18 and 41 are open. With the manifold in this configuration, the flow recording means 10 is capable of sensing the pressure on the high pressure side of the orifice plate from the high pressure signal line 36 and the pressure on the low pressure side of the orifice plate from signal line 48.

If it becomes necessary to calibrate the flow recording means 10, valve 41 is closed, block valves 24 and 26 are opened and bleed valve 28 is closed. Fluid from the high pressure side of the orifice plate is permitted to pass through block valve 24, across bleed valve 28 and then through block valve 26. Accordingly, the flow recording means may now be calibrated at zero because there is no differential in the pressure between lines 36 and 48.

The fluid which passes through pipeline 12 and is measured by the apparatus of the present invention often contains sand or grit or its contact with the inner surface of the manifold results in the deposition of scale or paraffin. Due to these deposits, the channels often become plugged or restricted and rodding becomes necessary. Rodding is the practice of passing a narrow, substantially rigid rod through the channels of a manifold in order to release and clean away any built-up scale or other deposits.

In the present invention it may be seen that with valves 18 and 41 closed, with lines 16, 34, 36, 48 and 40 disconnected, with end plugs 50 removed, and with valves 24, 28, 26 retracted, a stiff metal rod may be passed through first channel 22 to clean away any blockage. Likewise, a metal rod may be passed through channel 44 and 30 to the intersection of channel 22. Further, a rod may be passed through channels 31 and 32 until it reaches the intersection of channel 30, or through channels 45 and 46 until it reaches the intersection with channel 44. The rod also may be passed through vent channel 52 until it comes to the intersection of channel 22. It may be seen that all channels in the manifold may be rigorously cleaned by means of the rod and that no channel within the manifold is outside the reach of the rod.

Figure 2:
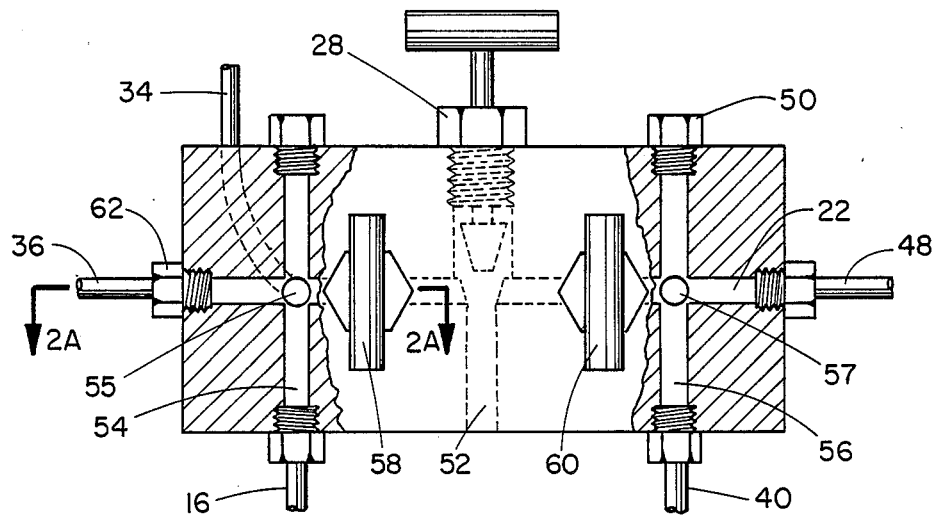
FIG. 2 is a frontal view in partial cross section of an alternative embodiment of the present invention.
Figure 2A:
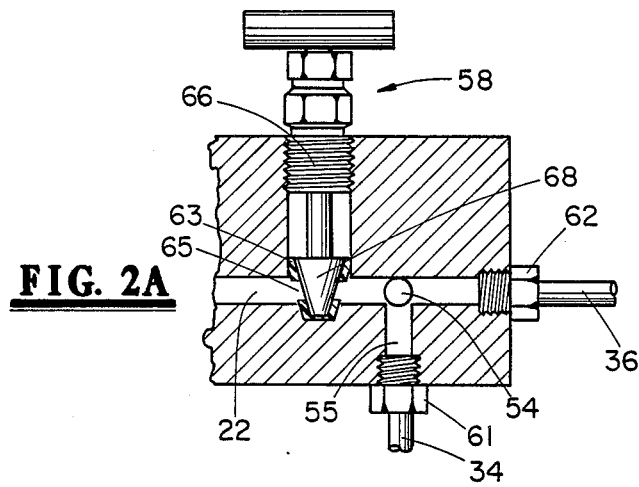
FIG. 2A is a partial top view in cross section of the manifold depicted in FIG. 2.

Referring now to FIGS. 2 and 2A, there may be seen an alternative embodiment of the present invention. As in FIG. 1, the high pressure side of the orifice plate (not shown) is connected to the manifold by means of line 16. A channel 54 passes through the body to intersect with first channel 22 and continues on to an external port, which is now blocked. Similarly, the low pressure side of the orifice plate (not shown) is connected by line 40 to channel 56 which passes through the body of the manifold to intersect with first channel 22 near the opposite end of the body.

In either embodiment, the plugs of each of the three valve assemblies are positionable in channel 22. Bleed valve 28 serves to open and close channel 22 to vent channel 52. Block valves 58 and 60 are located in channel 22 between bleed valve 28 and the intersections of channel 22 with channels 54 and 56, respectively. It has been found convenient to orient block valves 58 and 60 in channel 22 at 90° relative to bleed valve 28. With block valves 58 and 60 in the closed position, high pressure signal line 36 is connected to channel 22 by connector 62 and static line 34 is connected to channel 55 by connector 61. The low pressure signal line 48 may be connected either directly to first channel 22 or indirectly, by means of either channels 56 or 57. The port of a channel not used may be conveniently plugged. If desired, valves 18 and 41 may be incorporated into the unitized body to control flow through channels 30, 44 or 54, 56 respectively without departing from the present invention.

Figure 1A:
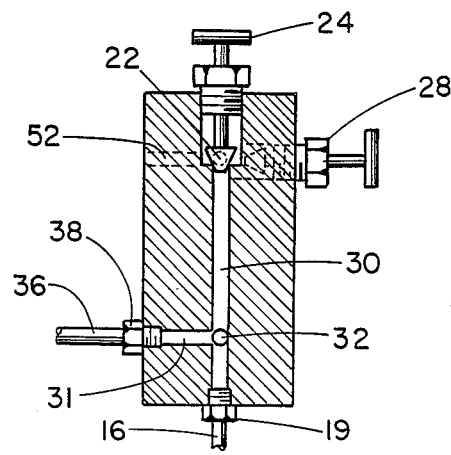
FIG. 1A is a side view in cross section of the manifold depicted in FIG. 1.

The alternative embodiment described in FIGS. 2 and 2A operates in a similar manner as in the embodiment shown in FIGS. 1 and 1A. With block valves 58 and 60 closed and bleed valve 28 open, a signal responsive to the high pressure side of orifice plate 14 is communicated to the flow recorder by means of line 16 to channel 54 and then to static line 34 and high pressure signal line 36. A signal responsive to the low pressure side of the orifice plate is communicated to the flow recorder by means of line 40 to channel 56 and then to low pressure signal line 48.

As described earlier, any leakage of fluid from block valve 58 would pass into channel 22 and out vent 52. With all lines and plugs removed and valves 58, 28 and 60 open, all channels, including channel 22, 54 and 56 may be fully rodded and no portion of a channel is outside the reach of the metal rod. Block valve 58 and 60 are conventionally known as "soft seat" valves as shown more particularly in FIG. 2A. A conical elastomeric seat 63 is disposed within the valve body along first channel 22 to receive plug 68. The elastomeric seat 63 has a hole or aperture 65 through the seat and aligned with channel 22 so fluid may pass therethrough. When plug 68 is engaged against the elastomeric seat 63, the aperture 65 is blocked. The deformation of the seat against the plug forms a bubble tight seal and fluid cannot pass. Bleed valve 28 and block valves 24 and 26 of FIGS. 1 and 1A are of a type described in FIG. 3.

Figure 3:
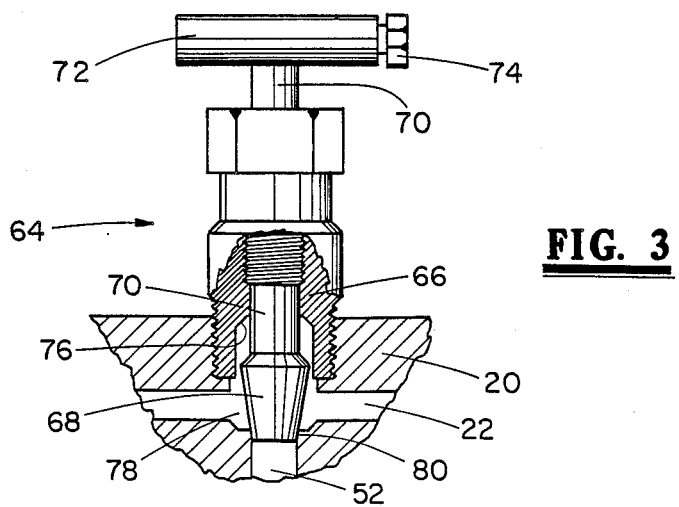
FIG. 3 depicts a valve assembly in partial cross section.

Referring now to FIG. 3, there may be seen a valve assembly 64 suitable for use as any hard seat in the manifold of the present invention such as a bleed valve 28 or block valves 24 or 26. Valve assembly 64 has a "hard seat" that provides a metal-to-metal seal for stopping the flow of fluid. Valve assembly 64 is composed of a bonnet 66 threadably secured to body 20 and having sealably disposed therein a threaded stem 70. Stem 70 has a handle 72 secured to one end by a lock nut 74, and has a conical plug 68 at the opposite end. A valve chamber 78 is disposed within the body to receive plug 68 and first channel 22 passes therethrough. A second channel 52, at a right angle to channel 22, passes through the body and intersects the valve chamber 78 and first channel 22 to form a 3-way fluid connection. Sealing surface 80 is radially exterior of the nominal diameter of the cylindrical walls of channel 22, so that the sealing surface does not interfere with rodding of channel 22 and is not contacted by the rod during rodding.

A metal seating surface 80 in the lower portion of valve chamber 78 is disposed radially about second channel 52 so when the valve assembly 64 is in the closed position the tip of conical plug 68 is in contact with metal seating surface 80 to effectively seal against the passage of fluid from second channel 52 to first channel 22. Conical plug 68 may optionally possess a hemispherical tip or ball which would protrude into channel 52 to perfect the seal. Seating surface 80 is radially exterior of the nominal diameter of the cylindrical walls of channel 22, so that the seating surface does not interfere with rodding of channel 22 and is not contacted by the rod during rodding.

Valve chamber 78 is of larger diameter than the plug 68 so when the valve assembly is in the closed position and plug 68 is engaging seating surface 80, an annulus or flow passageway is formed between plug 68 and the wall of the valve chamber 78 to permit fluid to flow down the length of first channel 22 unimpeded. In an alternative arrangement, the flow passageway may take the form of an annular groove cut either in the plug or in the inner surface of the valve chamber in the same plane as the first channel. When the valve is closed, fluid may pass through the groove and around the plug to keep the first channel unblocked. A third arrangement may be a large bore hole through the plug which is axially aligned with the first channel when the valve is in the fully closed position.

When the valve assembly 64 is in the fully open position, conical plug 68 is withdrawn from the valve chamber until it comes in contact with a stopping surface 76 which positively prevents the further withdrawal of the plug. In this fully open configuration, a metal rod may pass either down the length of first channel 22 or second channel 52 to dislodge and remove any accumulated blockage. The sealing surface of the plug is again radially exterior of the nominal diameter of the cylindrical surface of channel 22, so that rodding of channel 22 will not damage the plug 68 when the valve is in the fully open position.

I claim:

1. In a valve manifold for controlling transmission of high pressure and low pressure signals from a pipeline containing a flow restriction orifice plate to a flow measurement instrument for measuring fluid flow through the pipeline in response to the high pressure and low pressure signals, the valve manifold, including a unitized valve body and first, second, and third valve assemblies, each valve assembly at least partially disposed within the unitized valve body and including a bonnet fixedly secured to the unitized valve body, a valve stem threadably secured within the bonnet and axially movable along a stem axis, and a plug having a sealing surface at one end of the valve stem for selectively controlling flow past the valve assembly in response to rotational movement of the valve stem; the unitized valve body including, (a) a first channel through the unitized valve body having first ports at each end thereof and having a first axis, (b) a second channel interconnecting the first channel with a second port for venting pressure from the first channel and having a second axis, (c) a third channel interconnecting the first channel with a third port for inputting the high pressure signal to the unitized valve body, and (d) a fourth channel interconnecting the first channel with a fourth port for inputting the low pressure signal to the unitized valve body, the improvement comprising:

each of the first and second valve assemblies positioned within the unitized valve body along the first channel to selectively control transmission of pressure along the first channel;

the third valve assembly positioned in the unitized valve body along the first channel and between the first and second valve assemblies, such that the sealing surface of the third valve assembly passes through the first axis of the first channel when its valve stem is moved from a fully open position wherein the first channel is roddable to a fully closed position wherein the first channel is not roddable;

an annular seating surface within the unitized valve body spaced radially about the second axis of the second channel for sealing engagement with the sealing surface of the third valve assembly, such that the second port is sealed from the first channel when the third valve assembly is in the fully closed position;

the annular seating surface being positioned radially opposite the bonnet of the third valve assembly with respect to the first axis of the first channel such that the second channel between the first channel and the second port is roddable when the third valve assembly is in the fully open position; and a flow passageway between the unitized valve body and the plug of the third valve assembly for fluid communication along the first channel between the first and second valve assemblies when the third valve assembly is in the fully closed position.

2. The manifold of claim 1, wherein the flow passageway is an annulus-shaped passageway between the unitized valve body and the plug of the third valve assembly when the third valve assembly is in the fully closed position.

3. The manifold of claim 1, wherein the annular seating surface is a metallic seating surface formed by an interior surface of the unitized valve body.

4. The manifold of claim 1, further comprising:
first and second elastomeric seats each disposed within the unitized valve body along the first channel for sealingly engaging the respective plug of the first or second valve assemblies to block transmission of pressure through the first channel when either the first or second valve assembly is in the fully closed position.

5. The manifold of claim 1, further comprising:
a second annular seating surface spaced radially about the third flow channel for sealing engagement with the sealing surface of the first valve assembly, such that the third port is sealed from the first channel when the first valve assembly is in the fully closed position; and
a third annular seating surface spaced radially about the fourth flow passageway for sealing engagement with the sealing surface of the second valve assembly, such that fourth port is sealed from the first channel when the second valve assembly is in the fully closed position.

6. The manifold of claim 5, further comprising:
each of the second and third annular seating surfaces being metallic seating surfaces formed by a respective internal surface of the unitized valve body; and
the first and second valve assemblies positioned in the unitized valve body such that each of their sealing surfaces pass through the first axis of the first channel when its valve stem is moved from the fully open position to the fully closed position.

7. The manifold of claim 6, wherein:
the first channel is defined by a substantially cylindrical-shaped interior surface within the unitized valve body; and
each sealing surface of the first, second and third valve assemblies is radially exterior of the cylindrical surface of the first channel when the respective first, second and third valve assembly is in the fully open position.

8. In a valve manifold for controlling transmission of high pressure and low pressure signals from a pipeline containing a flow restriction orifice plate to a flow measurement instrument for measuring fluid flow through the pipeline in response to the high pressure and low pressure signals; the valve manifold including a unitized valve body and first, second, and third valve assemblies, each valve assembly at least partially disposed within the unitized valve body and including a bonnet fixedly secured to the unitized valve body, a valve stem threadably secured within the bonnet and axially movable along a stem axis, and a plug having a sealing surface at one end of the valve stem for selectively controlling flow past the valve assembly in response to rotational movement of the valve stem; the unitized valve body including; (a) a first channel through the unitized valve body having first ports at each end thereof and having a first axis, (b) a second channel interconnecting the first channel with a second port for venting pressure from the first channel and having a second axis, (c) a third channel interconnecting the first channel with a third port for inputting the high pressure signal to the unitized valve body, and (d) a fourth channel interconnecting the first channel with a fourth port for inputting the low pressure signal to the unitized valve body, the improvement comprising:

each of the first and second valve assemblies positioned within the unitized valve body along the first channel to selectively control transmission of pressure along the first channel;

the third valve assembly positioned in the unitized valve body along the first channel and between the first and second valve assemblies for sealing the first channel from the second port when in the fully closed position and maintaining communication between the first and second assemblies along the first channel when in either the fully open or fully closed positions;

the sealing surface of the third valve assembly passing through the first axis of the first channel when its valve stem is moved from a fully open position wherein the first channel is roddable to a fully closed position wherein the first channel is not roddable;

first, second and third annular seating surfaces each formed by an internal surface of the unitized valve body, the first seating surface spaced radially about the second channel for sealing engagement with the sealing surface of the third valve assembly, the second seating surface spaced radially about the third channel for sealing engagement with the sealing surface of the first valve assembly, and the third sealing surface spaced radially about the fourth channel for sealing engagement with the second valve assembly, each annular seating surface being positioned radially opposite the bonnet of its respective valve assembly with respect to the first axis of the first channel.

9. The manifold of claim 8, further comprising:
an annular-shaped passageway between the unitized valve body and the plug of the third valve assembly for fluid communication along the first channel between the first and second valve assemblies when the third valve assembly is in the fully closed position.

10. The manifold of claim 8, further comprising:
first and second elastomeric seats each disposed within the unitized valve body along the first channel for sealingly engaging the respective plug of the first or second valve assemblies to block transmission of pressure through the first channel when either the first or second valve assembly is in the fully closed position.

11. The manifold of claim 8, wherein each of the first, second and third annular seating surfaces are metallic seating surfaces formed by a respective internal surface of the unitized body.

12. In a valve manifold including a unitized valve body and first, second, and third valve assemblies each at least partially disposed within the unitized valve body and including a bonnet fixedly secured to the unitized valve body, a valve stem threadably secured within the bonnet and axially movable along a stem axis, and a plug having a sealing surface at one end of the valve stem for selectively controlling flow past the valve assembly in response to rotational movement of the valve stem; the unitized valve body including, (a) a first channel through the unitized valve body having first ports at each end thereof and having a first axis, and (b) a second channel interconnecting the first channel with a second port for venting pressure from the first channel and having a second axis, the improvement comprising:

each of the first and second valve assemblies positioned within the unitized valve body along the first channel to selectively control transmission of pressure along the first channel;

the third valve assembly positioned in the unitized valve body along the first channel and between the first and second valve assemblies for sealing the first channel from the second port when in the fully closed position and maintaining communication between the first and second assemblies along the first channel when in either the fully open or fully closed positions;

the sealing surface of the third valve assembly passing through the first axis of the first channel wherein the first channel is not roddable when the valve stem of the third valve assembly is moved to a fully closed position;

an annular seating surface within the unitized valve body spaced radially about the second axis of the second channel for sealing engagement with the sealing surface of the third valve assembly, such that the second port is sealed from the first channel when the third valve assembly is in the fully closed position; and the annular seating surface being positioned radially opposite the bonnet of the third valve assembly with respect to the first axis of the first channel such that the second channel between the first channel and the second port is roddable when the third valve assembly is in the fully open position.

13. The manifold of claim 12, further comprising:
a flow passageway between the unitized valve body and the plug of the third valve assembly for fluid communication along the first channel between the first and second valve assemblies when the third valve assembly is in the fully closed position.

14. The manifold of claim 12, wherein the annular seating surface is a metallic seating surface formed by an interior surface of the unitized valve body.

15. The manifold of claim 12, further comprising:
first and second elastomeric seats each disposed within the unitized valve body along the first channel for sealingly engaging the respective plug of the first or second valve assemblies to block transmission of pressure through the first channel when either the first or second valve assembly is in the fully closed position.

16. The manifold of claim 12, further comprising:
a third flow channel interconnecting the first channel with a third port for inputting a high pressure signal to the unitized body,
a fourth flow channel interconnecting the first channel with a fourth port for inputting a low pressure signal to the unitized valve body,
a second annular seating surface spaced radially about the third flow channel for sealing engagement with the sealing surface of the first valve assembly, such that the third port is sealed from the first channel when the first valve assembly is in the fully closed position; and a third annular seating surface spaced radially about the fourth flow passageway for sealing engagement with the sealing surface of the second valve assembly, such that the fourth port is sealed from the first channel when the second valve assembly is in the fully closed position.

17. The manifold of claim 16, further comprising:

each of the second and third annular seating surfaces being metallic seating surfaces formed by a respective internal surface of the unitized valve body; and the first and second valve assemblies positioned in the unitized valve body such that each of their sealing surfaces pass through the first axis of the first channel when its valve stem is moved from the fully open position to the fully closed position.

* * * * *